United States Patent [19]

Takeshita et al.

[11] Patent Number: 5,053,163
[45] Date of Patent: Oct. 1, 1991

[54] FERROELECTRIC LIQUID CRYSTAL COMPOSITION

[75] Inventors: Fusayuki Takeshita; Makoto Kikuchi; Mitsuyoshi Ichihashi; Kanetsugu Terashima; Kenji Furukawa, all of Chiba, Japan

[73] Assignee: Chisso Corporation, Ohsaka, Japan

[21] Appl. No.: 359,719

[22] Filed: May 31, 1989

[30] Foreign Application Priority Data

Jun. 3, 1988 [JP] Japan .................. 63-136798

[51] Int. Cl.$^5$ ............................................. C09K 19/34
[52] U.S. Cl. .......................... 252/299.61; 252/299.01; 359/103
[58] Field of Search ....................... 252/299.01, 299.61; 350/350 R, 250 S

[56] References Cited

U.S. PATENT DOCUMENTS

| | | | |
|---|---|---|---|
| 4,452,718 | 6/1984 | Schadt et al. | 252/299.61 |
| 4,657,695 | 4/1987 | Saito et al. | 252/299.61 |
| 4,765,924 | 8/1988 | Inoue et al. | 252/299.61 |
| 4,780,241 | 10/1988 | Furukawa et al. | 252/299.01 |
| 4,818,429 | 4/1989 | Saito et al. | 252/299.61 |
| 4,818,430 | 4/1989 | Saito et al. | 252/299.61 |
| 4,834,904 | 5/1989 | Krause et al. | 252/299.61 |
| 4,871,472 | 10/1989 | Krause et al. | 252/299.65 |
| 4,882,083 | 11/1989 | Terashima et al. | 252/299.61 |
| 4,882,086 | 11/1989 | Terashima et al. | 252/299.61 |
| 4,906,400 | 3/1990 | Saito | 252/299.61 |

FOREIGN PATENT DOCUMENTS 8606401 11/1986 World Int. Prop. O. ...... 252/299.61

OTHER PUBLICATIONS

Liang, J. C., et al., Mol. Cryst. Liq. Cryst., vol. 141, pp. 25-35 (1982).
Sackmann, M., Z. Chem., vol. 26, No. 1, pp. 21-23 (1986).
Demus, D., et al., Flussible Kristalle in Tabellen, Veb Dentscher Verlag for Grundstoffindustrie, Leipzig, pp. 259-260 (1974).

Primary Examiner—John S. Maples
Assistant Examiner—Richard Treanor
Attorney, Agent, or Firm—Wenderoth, Lind & Ponack

[57] ABSTRACT

A ferroelectric liquid crystal composition having a negative dielectric anisotropy, a good AC-stabilizing effect and still high-speed response properties, and a light switching element, are provided, which composition comprises a compound expressed by the formula

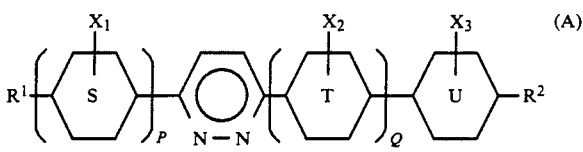

wherein $R^1$ and $R^2$ each represent a linear or branched alkyl group, alkoxy group, alkanoyloxy group, alkoxycarbonyl group, alkoxycarbonyloxy group or alkanoyl group each of 1 to 18 carbon atoms;

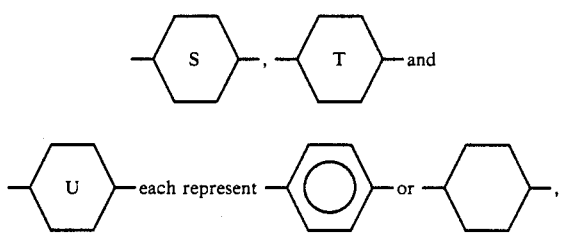

$X_1$, $X_2$ and $X_3$ each represent hydrogen atom or halogen atom; P and Q each represent 0 or 1; and P+Q is 0 or 1.

8 Claims, 1 Drawing Sheet

FERROELECTRIC LIQUID CRYSTAL COMPOSITION

BACKGROUND OF THE INVENTION

1. Field of the Invention

This invention relates to a ferroelectric liquid crystal composition. More particularly it relates to a ferroelectric liquid crystal composition comprising a chiral or achiral compound having a negative dielectric anisotropy, which composition also has a negative dielectric anisotropy, and a light switching element using the above-mentioned ferroelectric liquid crystal composition.

2. Description of the Prior Art

In recent years, liquid crystal display has come to be broadly utilized as display elements, making use of specific features of thin type, light weight, small power consumption, etc. However, most of these display elements utilize TN display mode wherein liquid crystal materials having nematic phase are used so that the response thereof is still yet slow in the application fields needing a high multiplexing; hence necessity of improvement therein has been urged.

A display mode which has recently been noted in such a present status is a display mode utilizing a light switching phenomenon proposed by N. A. Clark and S. T. Lagerwall (Applied Physics Letters, vol. 36, p. 899 (1980)). The presence of ferroelectric liquid crystals has been reported by R. B. Meyer et al in the year 1975 for the first time (J. de Phys., vol. 36, p. 69 (1975), and in the aspect of liquid crystal classification, the liquid crystals belong to chiral smectic C phase, chiral smectic I phase, chiral smectic F phase, chiral smectic G phase, chiral smectic H phase, chiral smectic J phase and chiral smectic K phase (hereinafter abbreviated to SC* phase, SI* phase, SF* phase, SG* phase, SH* phase, SJ* phase and SK* phase, respectively).

When the light switching effect of ferroelectric liquid crystals is utilized for display elements, there are two superior specific features as compared with TN display mode. The first specific feature consists in that the display elements reply at a very high rate and the response time is $1/100$ or less that of elements of TN display mode. The second specific feature consists in the memory effect thereof and a multiplex drive is easy as coupled with the above-mentioned high-rate response properties.

In order that display elements using ferroelectric liquid crystals are provided with memory properties, two methods are considered. One is a method proposed by N. A. Clark et al wherein the helix is untwisted by reducing the cell thickness (d) down to a thickness less than the helical pitch (p) (d<p), to thereby cause the memory properties to appear (see Appl. Phys. Lett., vol. 36, p. 899 (1980)). The other is a method found by Le Piesant wherein the memory properties are caused to appear utilizing an AC-stabilizing effect (Paris Liquid Crystal Conference, p. 297, 1984).

Most of current ferroelectric liquid crystal materials have a short helical pitch; hence in order to cause the memory properties to appear by the thinning proposed by N. A. Clark et al, it is necessary to keep the cell thickness at about 1 to 3 $\mu$m, but taking into account the current cell preparation technique, a problem is raised that this is difficult in the aspects of cost and yield. On the other hand, the method found by Le Piesant wherein the memory properties are caused to appear utilizing AS-stabilizing effect is effective only in the case of ferroelectric liquid crystal materials having negative dielectric anisotropy ($\Delta\epsilon$), but it is possible to cause the memory properties to appear even in a thick cell of 5 to 7 $\mu$m; hence it is possible to utilize current cell preparation technique so that the method is very practical.

The AC-stabilizing effect is directed to a mode utilizing a phenomenon that in the case of a ferroelectric liquid crystal in a low frequency, the spontaneous polarization (Ps) replies to impressed electric field, while in the case of that in a high frequency, the spontaneous polarization cannot follow, and as a result, paraelectric anisotropy contributes, and if the dielectric anisotropy value is negative ($\Delta\epsilon<0$), the liquid crystal molecule is compelled to be in a parallel state relative to the substrate; thus the memory properties appear even in a thick cell. The first report presenting a matrix display practically utilizing this AS-stabilizing effect is Jeary's report in 1985 (SID '85, Digest, p. 128 (1985)), but since then there has been almost no report. The main reason is that ferroelectric liquid crystal materials having a negative dielectric anisotropy are few. Further, according to Jeary's report, in order to cause the AC-stabilizing effect to appear, a voltage of about 40 V is necessary, but taking into account the driving voltage range of conventional IC, the AC-stabilizing effect is preferred to appear at far lower voltage (25 V or less). The AC-stabilizing effect appears at a lower voltage when the dielectric anisotropy has a larger negative value; hence a ferroelectric liquid crystal material having a large negative dielectric anisotropy value has been earnestly desired. Further, the response time of the ferroelectric liquid crystal material reported by Jeary et al is several msecs, that is, it is still slow in the practical aspect; hence appearance of a ferroelectric liquid crystal having a negative dielectric anisotropy value and also high-speed response properties has been desired.

SUMMARY OF THE INVENTION

A first object of the present invention is to provide a ferroelectric liquid crystal composition having a large negative dielectric anisotropy value, an AC-stabilizing effect at a low voltage and also high-speed response properties.

A second object of the present invention is to provide a light switching element using the above-mentioned liquid crystal composition.

In order to solve the above-mentioned problem, the present inventors have made extensive research on ferroelectric liquid crystal compositions, and as a result have found that when the following liquid crystal compounds are combined, a ferroelectric liquid crystal composition having a large negative dielectric anisotropy value and also high-speed response properties is obtained.

The present invention resides in (1) a ferroelectric liquid crystal composition comprising at least two components at least one of which is a compound expressed by the formula

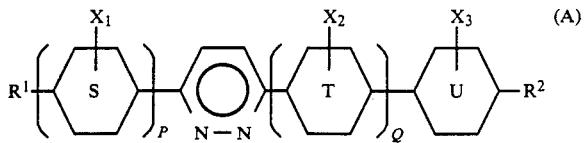

wherein $R^1$ and $R^2$ each represent a linear or branched alkyl group, alkoxy group, alkanoyloxy group, alkoxycarbonyl group, alkoxycarbonyloxy group or alkanoyl group each of 1 to 18 carbon atoms,

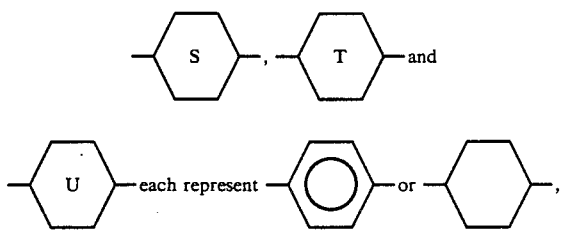

$X_1$, $X_2$ and $X_3$ each represent hydrogen atom or halogen atom, P and Q each represent 0 or 1 and P+Q is 0 or 1, and a light switching element using the above-mentioned liquid crystal composition.

DETAILED DESCRIPTION OF PREFERRED EMBODIMENTS

Figure 1:
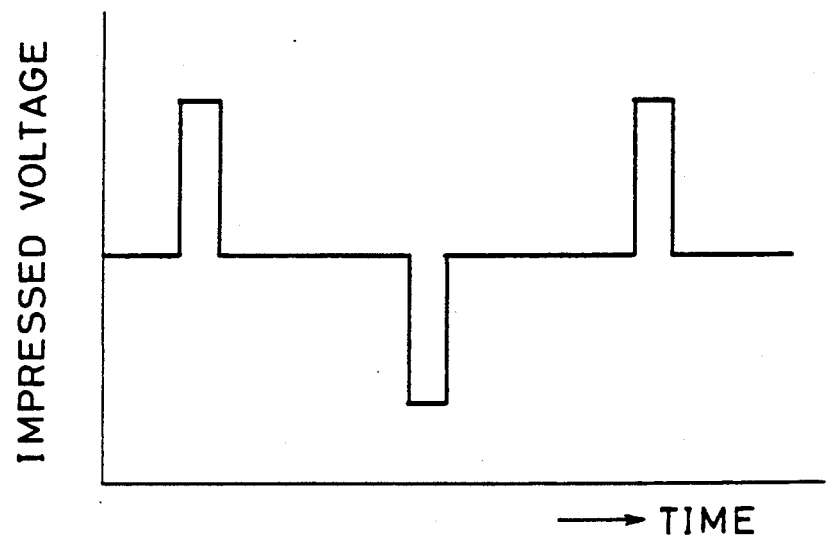
FIG. 1 shows a chart illustrating an impressed voltage wave in the ferroelectric liquid crystal composition of the present invention.

It is preferred for the ferroelectric liquid crystal composition of the present invention that the content of the compound expressed formula (A) is 5 to 50% by weight based on the weight of the composition and exhibits a negative dielectric anisotropy value.

Further, the ferroelectric liquid crystal composition of the present invention is preferred to be a ferroelectric liquid crystal composition comprising
a compound expressed by the formula

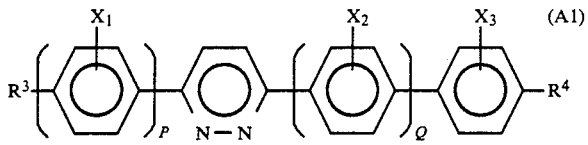

wherein $R^3$ and $R^4$ each represent a linear or branched alkyl group or alkoxy group each of 1 to 18 carbon atoms, $X_1$, $X_2$ and $X_3$ each represent hydrogen atom or halogen atom, P and Q each represent 0 or 1 and P+Q is 0 or 1, the content of which compound is 5 to 50% by weight based on the weight of the composition, said composition exhibiting a negative dielectric anisotropy. Furthermore, the ferroelectric liquid crystal composition of the present invention is preferred to be a ferroelectric liquid crystal composition comprising
a compound expressed by the formula

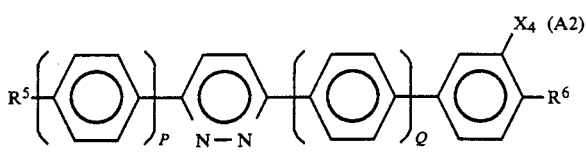

wherein $R^5$ and $R^6$ each represent a linear or branched alkyl group or alkoxy group each of 1 to 18 carbon atoms, $X_4$ represents hydrogen atom or halogen atom, P and Q each represent 0 or 1 and P+Q is 0 or 1,
the content of which compound is 5 to 50% by weight based on the weight of the composition, said composition exhibiting a negative dielectric anisotropy.

Still further, the ferroelectric liquid crystal composition is preferred to be a ferroelectric liquid crystal composition comprising at least the following three components A, B and C, the proportion of A being 5 to 50% by weight, that of B being 5 to 50% by weight and that of C being 5 to 50% by weight, each based on the weight of the composition, the composition exhibiting a negative dielectric anisotropy:

component A is a compound expressed by the above-mentioned formula (A2), component B is a compound expressed by the formula

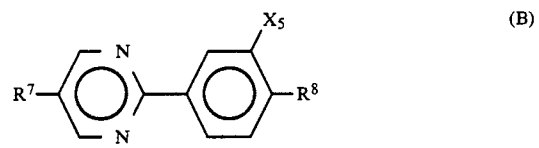

wherein $R^7$ and $R^8$ each represent a linear or branched alkyl group or alkoxy group each of 1 to 18 carbon atoms and $X_5$ represents hydrogen atom or halogen atom, and component C is a compound expressed by the formula

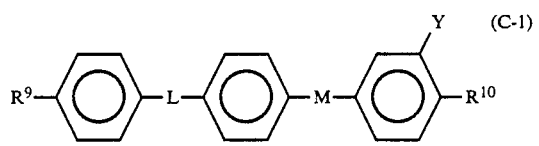

wherein $R^9$ and $R^{10}$ each represent a linear or branched alkyl group or alkoxy group each of 1 to 18 carbon atoms, at least one of $R^9$ and $R^{10}$ exhibits an optical activity, either one of L or M represents a single bond, the other represents

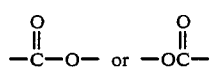

and Y represents hydrogen atom, halogen atom or cyano group,
a compound expressed by the formula

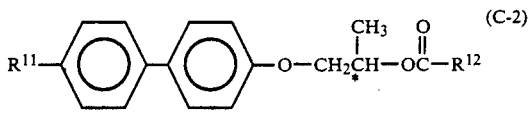

wherein $R^{11}$ represents a linear or branched alkyl group or alkoxy group each of 1 to 18 carbon atoms, $R^{12}$ represents a linear or branched alkyl group of 1 to 18 carbon atoms or

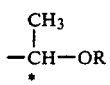

wherein R represents an alkyl group of 1 to 10 carbon atoms and * indicates an asymmetric carbon atom, or
a compound expressed by the formula

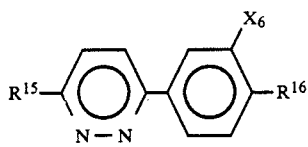  (C-3)

wherein $R^{13}$ represents a linear or branched alkyl group or alkoxy group each of 1 to 18 carbon atoms, $R^{14}$ represents a linear or branched alkyl group of 2 to 18 carbon atoms, E and F each represent —$OCH_2$— or —$CH_2O$—, either one of E or F represents a single bond and * indicates an asymmetric carbon atom.

Further, the compound expressed by the formula (A2) in the above ferroelectric liquid crystal composition is preferred to be a compound expressed by the formula

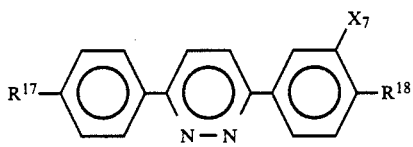  (A2-1)

wherein $R^{15}$ and $R^{16}$ each represent a linear or branched alkyl group or alkoxy group each of 1 to 18 carbon atoms and $X_6$ represents hydrogen atom or halogen atom, or a compound expressed by the formula

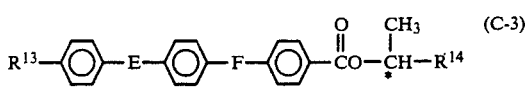  (A2-2)

wherein $R^{17}$ and $R^{18}$ each represent a linear or branched alkyl group or alkoxy group each of 1 to 18 carbon atoms and $X_7$ represents hydrogen atom or halogen atom.

The compound of the formula (A) used in the present invention has a pyridazine ring and also has a large dipole moment in the direction of the minor axis of the molecule; hence the compound has a specific feature of a large negative dielectric anisotropy value. The dielectric anisotropy values of main compounds belonging thereto were measured to give those in the range of about −8 to −2.

The compounds expressed by the formula (A) are disclosed in the following literatures:

Zashke H , Hyna C., Schubert H., Z. Chem. 17, 333 (1977); Schubert H., Koch R., Weinbrecher CH., Z. Chem. 6, 467 (1966); Weygand C., Lanzendorf W., J. prakt. Chem., 151, 221 (1938); Japanese patent application laid-open Nos. Sho 60-226861/1985, Sho 63-68571/1988, and Sho 63-72680/1988, each filed by the present applicant:

Representative compounds expressed by the formula (A) are illustrated below in Tables 1-5. In addition, in the present invention, even compounds having no smectic C phase are usable as far as they are used in a quantity that has no notable influence upon the phase transition points of the composition.

TABLE 1

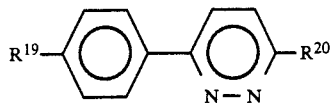

| In the above formula | | Phase transition point (°C.) | | | | |
|---|---|---|---|---|---|---|
| $R^{19}$ | $R^{20}$ | C | SG | SC | SA | I |
| $C_5H_{11}$— | $C_9H_{19}O$— | • 89 | — | (• 81.5) | — | • |
| $C_6H_{13}$— | $C_5H_{11}O$— | • 90 | — | — | — | • |
| $C_6H_{13}$— | $C_6H_{13}O$— | • 80 | — | (• 78) | — | • |
| $C_6H_{13}$— | $C_7H_{15}O$— | • 86.5 | — | (• 78) | — | • |
| $C_6H_{13}$— | $C_8H_{17}O$— | • 82.5 | — | (• 80) | — | • |
| $C_6H_{13}$— | $C_9H_{19}O$— | • 92.5 | — | — | — | • |
| $C_6H_{13}$— | $C_{10}H_{21}O$— | • 88 | — | (• 81) | — | • |
| $C_8H_{17}$— | $C_5H_{11}O$— | • 93 | — | — | — | • |
| $C_8H_{17}$— | $C_6H_{13}O$— | • 89 | — | (• 82) | — | • |
| $C_8H_{17}$— | $C_7H_{15}O$— | • 92.5 | — | (• 82.5) | — | • |
| $C_8H_{17}$— | $C_8H_{17}O$— | • 88.5 | — | (• 84.5) | — | • |
| $C_8H_{17}$— | $C_9H_{19}O$— | • 93 | — | — | — | • |
| $C_5H_{11}O$— | $C_3H_7O$— | • 111 | — | — | — | • |
| $C_5H_{11}O$— | $C_4H_9O$— | • 102.5 | — | • 104 | — | • |
| $C_5H_{11}O$— | $C_5H_{11}O$— | • 93.5 | — | • 100.5 | — | • |
| $C_5H_{11}O$— | $C_6H_{13}O$— | • 86.5 | — | • 101.5 | — | • |
| $C_5H_{11}O$— | $C_7H_{15}O$— | • 93 | — | • 100 | — | • |
| $C_5H_{11}O$— | $C_8H_{17}O$— | • 88.5 | — | • 101 | — | • |
| $C_5H_{11}O$— | $C_9H_{19}O$— | • 98.5 | — | • 101 | — | • |
| $C_5H_{11}O$— | $C_{10}H_{21}O$— | • 97 | — | • 100 | — | • |
| $C_6H_{13}O$— | $C_3H_7O$— | • 112.5 | — | — | — | • |
| $C_6H_{13}O$— | $C_4H_9O$— | • 102 | — | • 108 | — | • |
| $C_6H_{13}O$— | $C_5H_{11}O$— | • 91 | — | • 104 | — | • |
| $C_6H_{13}O$— | $C_6H_{13}O$— | • 87 | — | • 106 | — | • |
| $C_6H_{13}O$— | $C_7H_{15}O$— | • 88 | — | • 105 | — | • |
| $C_6H_{13}O$— | $C_8H_{17}O$— | • 84 | — | • 105.5 | — | • |
| $C_6H_{13}O$— | $C_9H_{19}O$— | • 91.5 | — | • 105 | — | • |
| $C_6H_{13}O$— | $C_{10}H_{21}O$— | • 90.5 | — | • 104.5 | — | • |
| $C_7H_{15}O$— | $C_6H_{13}O$— | • 86.6 | — | • 103.5 | — | • |
| $C_7H_{15}O$— | $C_8H_{17}O$— | • 90.2 | — | • 103.9 | — | • |
| $C_5H_{11}O$— | $C_6H_{13}O$— | • 96 | (• 86.5) | • 110 | — | • |

(Note)
C, SG, SC, SA and I represent crystal, smectic G phase, smectic C phase, smectic A phase, and isotropic liquid, respectively

TABLE 2

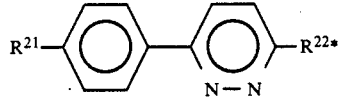

| In the above formula | | Phase transition point (°C.) | | | | |
|---|---|---|---|---|---|---|
| $R^{21}$ | $R^{22*}$ (optically active group) | C | SG | SC* | SA | I |
| $C_9H_{19}$— | 2-methylbutyl | • 81.0 | — | — | — | • |
| $C_8H_{17}O$— | 2-methylbutyl | • 77.5 | (• 75.4) | — | — | • |
| $C_3H_7$— | 2-methylhexyloxy | • 67.1 | — | — | — | • |
| $C_9H_{19}$— | 2-methyldecyloxy | • 73.2 | — | — | — | • |
| $C_5H_{11}$— | 2-methylbutyloxy | • 94.0 | — | — | — | • |
| $C_9H_{19}$— | 2-methylbutyloxy | • 77.8 | — | — | — | • |
| $C_{12}H_{25}$— | 2-methylbutyloxy | • 78.3 | — | — | — | • |
| $C_{15}H_{31}$— | 2-methylbutyloxy | • 85.3 | — | — | — | • |
| $C_8H_{17}O$— | 2-methylbutyloxy | • 91.4 | — | — | — | • |
| $C_{10}H_{21}O$— | 2-methylbutyloxy | • 87.4 | — | (• 80.9) | — | • |
| $C_{14}H_{29}O$— | 2-methylbutyloxy | • 86.4 | — | — | — | • |
| $C_5H_{11}$— | 1-methylheptyloxy | • 54.8 | — | — | — | • |

TABLE 2-continued

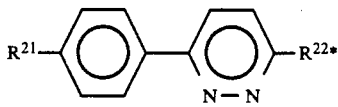

| In the above formula | | Phase transition point (°C.) | | | | |
|---|---|---|---|---|---|---|
| $R^{21}$ | $R^{22*}$ (optically active group) | C | SG | SC* | SA | I |
| $C_{12}H_{25}-$ | 1-methylheptyloxy | • 56.3 | — | — | — | • |
| $C_{10}H_{21}O-$ | 1-methylheptyloxy | • 87.4 | — | — | — | • |
| $C_8H_{17}O-$ | 1-methylbutyloxy | • 84.8 | — | — | — | • |
| $C_8H_{17}O-$ | 1-epthylheptyloxy | • 66.1 | — | — | — | • |
| $C_9H_{19}-$ | 1-methylnonyloxy | • 70.1 | — | — | — | • |
| $C_{12}H_{25}-$ | 1-methyloctyloxy | • 58.2 | — | — | — | • |

TABLE 3

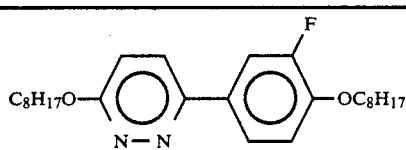

Phase transition point (°C.): C $\xrightarrow{89.0}$ I

TABLE 4

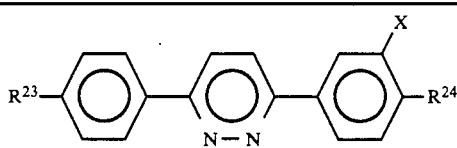

| In the above formula | | | Phase transition point (°C.) | | | | |
|---|---|---|---|---|---|---|---|
| $R^{23}$ | $R^{24}$ | X | C | $S_2$ | SC* | N(N*) | I |
| $C_4H_9-$ | $C_4H_9-$ | H | • 207 | • 213 | — | • 220 | • |
| $C_5H_{11}-$ | $C_5H_{11}-$ | H | • 194 | • 226 | — | • 227 | • |
| $C_6H_{13}-$ | $C_6H_{13}-$ | H | • 187 | • 223 | — | — | • |
| $C_4H_9O-$ | $C_4H_9O-$ | H | • 187 | • 258 | — | • 277 | • |
| $C_5H_{11}O-$ | $C_5H_{11}O-$ | H | • 178 | • 257 | — | • 262 | • |
| $C_6H_{13}O-$ | $C_9H_{19}-$ | H | • 84.6 | • 129.4 | • 237.0 | — | • |
| $C_3H_7-$ | 1-methylheptyloxy* | H | • 116.0 | — | • 133.6 | • 137.8 | • |
| $C_3H_7-$ | 5-methylheptyloxy* | H | • 143.0 | — | • 219.5 | • 222.7 | • |
| $C_3H_7-$ | 6-methyloctyloxy* | H | •146.0 | •135.9 | •228.0 | — | 0 |
| $C_3H_7-$ | 8-methyldecyloxy* | H | • 128.8 | • 140.0 | • 227.9 | — | • |
| $C_9H_{17}-$ | 1-methylheptyloxy* | H | • 120.5 | — | • 150.7 | — | • |
| $C_9H_{19}-$ | 1-methylheptyloxy* | F | • 105 | — | • 137 | — | • |

(Note)
N, * and $S_2$ represent nematic phase, optically actove group and unidentified smectic phase, respectively.

TABLE 5

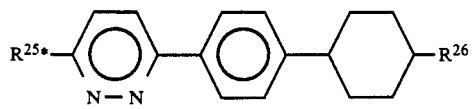

| In the above formula | | Phase transition point (°C.) | | | |
|---|---|---|---|---|---|
| $R^{25*}$ | $R^{26}$ | C | SC* | SA | I |
| 2-methylbutyloxy* | $C_5H_{11}-$ | • 177.2 | — | • 177.4 | • |
| 1-methylheptyloxy* | $C_5H_{11}-$ | • 116.0 | — | — | • |

TABLE 5-continued

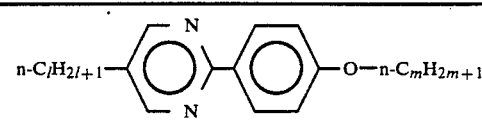

| In the above formula | | Phase transition point (°C.) | | | |
|---|---|---|---|---|---|
| $R^{25*}$ | $R^{26}$ | C | SC* | SA | I |
| 4-methylhexyloxy* | $C_5H_{11}-$ | • 151.0 | — | • 179.5 | • |

Main compounds of the formula (B) are shown in the following Tables 6–8.

TABLE 6

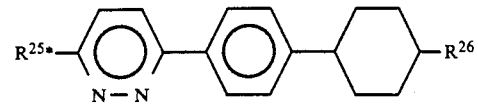

$n-C_lH_{2l+1}-\bigcirc-\bigcirc-O-n-C_mH_{2m+1}$

| In the above formula | | Phase transition point (°C.) | | | | |
|---|---|---|---|---|---|---|
| l | m | C | SC | SA | N | I |
| 8 | 6 | • 27.5 | • 47.4 | • 58.1 | • 66.3 | • |
| 9 | " | • 24 | • 43 | • 69.5 | • 70.5 | • |
| 10 | " | • 36 | • 57.5 | • 71.5 | — | • |
| 9 | 7 | • 32.5 | • 48 | • 72.5 | — | • |
| 10 | " | • 46 | • 62.5 | • 72 | — | • |
| 8 | 8 | • 35 | • 56.5 | • 63.1 | • 69.8 | • |
| 9 | " | • 33 | • 60 | • 75.5 | — | • |
| 10 | " | • 37 | • 68.5 | • 73.5 | — | • |
| 7 | 9 | • 47.2 | • 50.7 | • 54.7 | • 68.6 | • |
| 8 | " | • 35.3 | • 58.5 | • 65.8 | • 68.9 | • |
| 8 | 10 | • 32.8 | • 60.8 | • 66.5 | • 70.4 | • |
| 7 | 11 | • 55 | (• 54.5) | • 62.5 | • 70 | • |
| 8 | " | • 45.8 | • 61.0 | • 67.3 | • 69.4 | • |
| 7 | 12 | • 59.5 | (• 57.5) | • 63 | • 71 | • |
| 8 | " | • 44 | • 62.6 | • 68.0 | • 70.0 | • |

TABLE 7

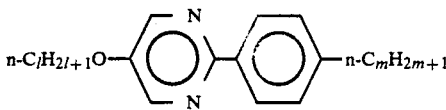

| In the above formula | | Phase transition point (°C.) | | | | |
|---|---|---|---|---|---|---|
| l | m | C | $S_3$ | SC | SA | I |
| 7 | 6 | • 32.5 | — | • 50.6 | • 76.6 | • |
| 8 | " | • 27.0 | — | • 67.5 | • 84.2 | • |
| 9 | " | • 47.7 | — | • 77.2 | • 83.6 | • |
| 10 | " | • 38.1 | • 35.2 | • 82.4 | • 86.5 | • |
| 11 | " | • 38.8 | • 42.3 | • 84.3 | • 86.4 | • |
| 12 | " | • 35.0 | • 47.4 | • 85.6 | • 87.1 | • |
| 13 | " | • 41.7 | • 48.0 | • 82.7 | • 84.8 | • |
| 14 | " | • 34.4 | • 54.9 | • 85.2 | • 86.6 | • |
| 15 | " | • 49.9 | • 56.7 | • 83.3 | • 85.2 | • |
| 7 | 7 | • 32.2 | — | • 45.0 | • 77.5 | • |
| 8 | " | • 30.8 | — | • 64.0 | • 84.4 | • |
| 9 | " | • 34.2 | — | • 76.3 | • 85.1 | • |
| 10 | " | • 32.2 | • 33.4 | • 83.1 | • 87.7 | • |
| 11 | " | • 38.7 | • 45.2 | • 86.8 | • 88.6 | • |
| 12 | " | • 45.8 | • 54.2 | • 88.6 | • 89.3 | • |
| 7 | 8 | • 45.1 | — | (• 39.0) | • 77.5 | • |
| 8 | " | • 38.4 | — | • 54.8 | • 83.6 | • |
| 9 | " | • 40.0 | — | • 76.0 | • 84.6 | • |
| 10 | " | • 40.3 | (• 32.8) | • 83.8 | • 88.4 | • |
| 11 | " | • 55.6 | — | • 87.2 | — | • |
| 12 | " | • 40.5 | • 57.8 | • 88.7 | — | • |
| 13 | " | • 54.1 | • 62.2 | • 88.2 | — | • |
| 8 | 9 | • 35.5 | (• 28.5) | • 53.0 | • 84.5 | • |
| 9 | " | • 39.0 | — | • 73.9 | • 84.9 | • |
| 10 | " | • 37.0 | (• 31.7) | • 83.0 | • 87.1 | • |
| 11 | " | • 45.0 | • 46.2 | • 87.0 | — | • |
| 12 | " | • 46.5 | • 59.0 | • 88.9 | — | • |
| 13 | " | • 52.0 | • 65.3 | • 88.8 | — | • |
| 8 | 10 | • 31.7 | — | • 43.0 | • 82.8 | • |
| 9 | " | • 46.6 | — | • 71.4 | • 83.8 | • |
| 10 | " | • 42.0 | — | • 80.9 | • 87.0 | • |
| 11 | " | • 51.4 | (• 47.0) | • 86.5 | — | • |
| 12 | " | • 51.7 | • 59.4 | • 88.2 | — | • |

(Note)
$S_3$: unidentified smectic phase

TABLE 8

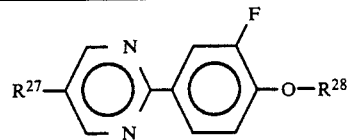

(B-3)

| In the above formula | | Phase transition point (°C.) | | | | |
|---|---|---|---|---|---|---|
| $R^{27}$ | $R^{28}$ | C | SC* | SA | N(N*) | I |
| $C_8H_{17}$— | $C_6H_{13}$— | • 26 | • 38.6 | • 48 | — | • |
| $C_8H_{17}$— | $C_8H_{17}$— | • 12 | • 26.8 | • 39.4 | • 42.4 | • |
| $C_8H_{17}$— | 3-methylpentyl* | • 40.2 | — | — | — | • |
| $C_9H_{19}$— | 3-methylpentyl* | • 41.1 | — | — | — | • |
| $C_{12}H_{25}$— | 3-methylpentyl* | • 39.4 | — | — | — | • |
| $C_7H_{15}$— | 4-methylhexyl* | • 39.5 | (• 28.1) | • 41.7 | — | • |
| $C_8H_{17}$— | 4-methylhexyl* | • 35.2 | • 36.9 | • 41.0 | — | • |
| $C_8H_{17}$— | (±)4-methylhexyl | • 35.2 | • 36.9 | • 41.0 | — | • |
| $C_9H_{19}$— | 4-methylhexyl* | • 40.4 | • 44.4 | • 47.1 | — | • |
| $C_{12}H_{25}$— | 4-methylhexyl* | • 38.8 | • 48.7 | • 49.0 | — | • |
| $C_7H_{15}$— | 5-methylheptyl* | • 30.0 | — | • 38.7 | — | • |
| $C_8H_{17}$— | 5-methylheptyl* | • 39.2 | (• 30.6 | • 38.6) | — | • |
| $C_9H_{19}$— | 5-methylheptyl* | • 36.0 | • 37.5 | • 44.5 | — | • |
| $C_{12}H_{25}$— | 5-methylheptyl* | • 37.3 | • 46.7 | — | — | • |
| $C_5H_{11}$— | 6-methyloctyl* | • 50.0 | — | — | (• 25.7) | • |
| $C_6H_{13}$— | 6-methyloctyl* | • 28.9 | (• 16.8 | • 26.0 | • 27.5) | • |
| $C_7H_{15}$— | 6-methyloctyl* | • 29.2 | (• 23.0) | • 42.1 | — | • |
| $C_8H_{17}$— | 6-methyloctyl* | • 10.0 | • 33.2 | • 43.2 | — | • |
| $C_9H_{19}$— | 6-methyloctyl* | • 26.0 | • 42.3 | • 51.0 | — | • |
| $C_{12}H_{25}$— | 6-methyloctyl* | • 46.0 | • 53.1 | — | — | • |
| $C_8H_{17}$— | 7-methylnonyl* | • 2.0 | • 24.3 | • 42.3 | — | • |
| $C_8H_{17}$— | 8-methyldecyl* | • 16.0 | • 34.8 | • 45.2 | — | • |

(Note)
*optically active group,
(±): racemic form

Main compounds of the formula (C-1) will be illustrated below in the following Tables 9–12.

TABLE 9

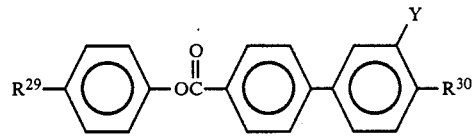

| In the above formula | | | Phase transition point (°C.) | | | | | |
|---|---|---|---|---|---|---|---|---|
| $R^{29}$ | $R^{30}$ | Y | C | SB | SC* | SA | N* | I |
| $C_8H_{17}O$— | 1-methylbutyl* | CN | • 87.4 | — | — | • 106.8 | • 108.7 | • |
| $C_7H_{15}$— | 1-methylheptyloxy* | H | • 51.0 | (• 36.2) | • 69.0 | • 76.0 | • 91.5 | • |
| $C_8H_{17}$— | 1-methylheptyloxy* | H | • 55.0 | (• 39.5) | • 71.5 | • 83.6 | • 92.3 | • |
| $C_8H_{17}O$— | 1-methylheptyloxy* | H | • 78.7 | — | • 103.3 | — | • 120.8 | • |
| $C_6H_{13}$— | 1-methylheptyloxy* | F | • 30.0 | — | • 60.4 | • 61.4 | • 83.0 | • |
| $C_7H_{15}$— | 1-methylheptyloxy* | F | • 36.0 | — | • 67.0 | — | • 78.6 | • |
| $C_8H_{17}$— | 1-methylheptyloxy* | F | • 39.0 | — | • 71.2 | — | — | • |
| $C_8H_{17}O$— | 1-methylheptyloxy* | F | • 52.0 | — | • 103.9 | — | • 109.4 | • |
| $C_8H_{17}O$— | 1-methylheptyloxy* | Cl | • 31.0 | — | • 77.4 | — | • 78.2 | • |
| $C_8H_{17}$— | 1-methylheptyloxy* | CN | — | — | • 62.4 | — | — | • |
| $C_6H_{13}O$— | 1-methylheptyloxy* | CN | — | — | • 41.6 | • 91.3 | — | • |
| $C_7H_{15}O$— | 1-methylheptyloxy* | CN | — | — | • 54.4 | • 92.8 | — | • |
| $C_8H_{17}O$— | 1-methylheptyloxy* | CN | • 27.5 | — | • 57.0 | • 94.3 | — | • |
| $C_9H_{19}O$— | 1-methylheptyloxy* | CN | • 42.8 | — | • 48.7 | • 90.8 | — | • |
| $C_{10}H_{21}O$— | 1-methylheptyloxy* | CN | • 67.8 | — | (• 57.8) | • 98.4 | — | • |
| $C_{12}H_{25}O$— | 1-methylheptyloxy* | CN | • 34.5 | — | • 51.0 | • 99.9 | — | • |
| $C_8H_{17}$— | 2-methylbutyloxy* | Br | • 77.0 | — | (• 66.8) | — | • 94.5 | • |
| $C_6H_{13}$— | 2-methylbutyloxy* | CN | • 70.5 | — | (• 43.5) | • 129.4 | — | • |
| $C_8H_{17}O$— | 2-methylbutyloxy* | CN | • 62.4 | — | (• 38.0) | • 159.7 | — | • |
| $C_8H_{17}$— | 6-methyloctyloxy* | CN | • 71.0 | — | • 119.9 | • 149.3 | — | • |
| $C_7H_{15}O$— | 6-methyloctyloxy* | CN | • 103.4 | — | • 141.6 | • 171.1 | — | • |
| $C_8H_{17}O$— | 6-methyloctyloxy* | CN | • 97.4 | — | • 142.0 | • 170.0 | — | • |
| $C_5H_{11}$— | 8-methyldecyloxy* | CN | • 99.0 | — | • 109.3 | • 153.3 | — | • |
| $C_8H_{17}O$— | 8-methyldecyloxy* | CN | • 99.8 | — | • 147.1 | • 167.2 | — | • |
| 1-methyl- | $C_8H_{17}O$— | F | • 51.0 | — | • 100.5 | • 121.5 | — | • |

TABLE 9-continued

R29—⟨phenyl⟩—O-CO—⟨phenyl⟩—⟨phenyl(Y)⟩—R30

| In the above formula | | | Phase transition point (°C.) | | | | | |
|---|---|---|---|---|---|---|---|---|
| R29 | R30 | Y | C | SB | SC* | SA | N* | I |
| heptyloxy* | | | | | | | | |

(Note)
SB, * and (±) represent smectic B phase, optically active group and racemic form, respectively.

TABLE 10

R31—⟨phenyl⟩—⟨phenyl⟩—O-CO—⟨phenyl(Y)⟩—R32

| In the above formula | | | Phase transition point (°C.) | | | | | |
|---|---|---|---|---|---|---|---|---|
| R31 | R32 | Y | C | SB | SC* | SA | N* | I |
| $C_8H_{17}O-$ | 1-methylheptyloxy* | H | • 78.2 | — | • 99.0 | — | • 122.3 | • |
| $C_8H_{17}-$ | 1-methylheptyloxy* | F | • 46.0 | — | • 78.2 | — | • 82.5 | • |
| $C_6H_{13}O-$ | 1-methylheptyloxy* | F | • 86.0 | — | • 107.6 | — | • 117.8 | • |
| $C_7H_{15}-$ | 1-methylheptyloxy* | Cl | • 52.5 | — | • 63.1 | — | • 67.2 | • |
| $C_8H_{17}-$ | 1-methylheptyloxy* | Br | • 53.5 | — | • 56.5 | — | — | • |
| $C_8H_{17}-$ | 1-methylheptyloxy* | CN | • 54.3 | — | (• 42.5) | • 73.2 | — | • |
| $C_8H_{17}O-$ | 1-methylheptyloxy* | CN | • 67.4 | — | • 90.0 | • 104.7 | — | • |
| $C_{12}H_{25}O-$ | 1-methylheptyloxy* | CN | • 72.0 | — | • 99.7 | • 104.0 | — | • |
| $C_8H_{17}-$ | 2-methylbutyloxy* | F | • 105.5 | — | • 117.3 | — | • 131.5 | • |
| $C_8H_{17}-$ | 8-methyldecyloxy* | CN | • 71.0 | — | • 143.3 | • 146.2 | — | • |
| $C_7H_{15}O-$ | 8-methyldecyloxy* | CN | • 91.0 | — | • 165.2 | • 168.2 | — | • |
| $C_8H_{17}O-$ | 8-methyldecyloxy* | CN | • 86.0 | — | • 166.4 | • 168.1 | — | • |
| $C_8H_{17}O-$ | 2-methylbutyl* | F | • 61.4 | — | • 104.0 | — | • 108.0 | • |
| $C_8H_{17}-$ | 2-methylbutyl* | CN | • 33.0 | (• 11.4) | • 35.0 | • 89.3 | — | • |
| $C_8H_{17}O-$ | 2-methylbutyl* | CN | • 47.5 | — | • 85.0 | • 121.3 | • 123.6 | • |
| $C_{10}H_{21}O-$ | 2-methylbutyl* | CN | • 52.7 | — | • 86.8 | • 120.8 | — | • |

TABLE 11

R33—⟨phenyl⟩—CO-O—⟨phenyl⟩—⟨phenyl(Y)⟩—R34

| In the above formula | | | Phase transition point (°C.) | | | | | |
|---|---|---|---|---|---|---|---|---|
| R33 | R34 | Y | C | SB | SC* | SA | N* | I |
| $C_8H_{17}-$ | 4-methylhexyl* | H | • 81.5 | — | • 94.5 | — | • 125.5 | • |
| $C_{12}H_{25}O-$ | 2-methylbutyloxy* | Br | • 59.0 | — | • 91.1 | • 127.7 | — | • |
| $C_8H_{17}O-$ | 2-methylbutyloxy* | CN | • 70.0 | — | (• 61.9) | • 130.4 | — | • |
| $C_7H_{15}O-$ | 1-methylheptyloxy* | H | • 76.0 | — | • 91.5 | — | • 124.6 | • |
| $C_{11}H_{23}O-$ | 1-methylheptyloxy* | H | • 66.9 | — | • 109.1 | — | • 118.3 | • |
| $C_8H_{17}-$ | 1-methylheptyloxy* | F | • 48.0 | — | — | • 78.6 | • 79.2 | • |
| $C_{10}H_{21}-$ | 1-methylheptyloxy* | F | • 46.5 | — | • 50.0 | • 83.7 | — | • |
| $C_8H_{17}O-$ | 1-methylheptyloxy* | F | • 67.0 | — | (• 65.0) | • 117.1 | — | • |
| $C_{10}H_{21}O-$ | 1-methylheptyloxy* | CN | • 50.0 | — | • 52.0 | • 82.5 | — | • |
| $C_8H_{17}O-$ | 5-methylheptyloxy* | H | • 95.0 | — | • 138.7 | — | • 159.1 | • |
| $C_8H_{17}O-$ | 6-methyloctyloxy* | H | • 78.5 | — | • 135.9 | — | • 154.7 | • |

TABLE 12

R35—⟨phenyl⟩—⟨phenyl⟩—CO-O—⟨phenyl(Y)⟩—R36

| In the above formula | | | Phase transition point (°C.) | | | | | |
|---|---|---|---|---|---|---|---|---|
| R35 | R36 | Y | C | SH | SC* | SA | N* | I |
| $C_{12}H_{25}-$ | 6-methyloctyl* | F | • 47.5 | — | • 103.3 | • 120.0 | — | • |
| $C_8H_{17}O-$ | 6-methyloctyl* | F | • 81.0 | — | • 127.8 | • 164.8 | — | • |
| $C_8H_{17}O-$ | 1-methylheptyloxy* | H | • 65.7 | • 83.0 | • 108.0 | • 149.0 | — | • |

TABLE 12-continued

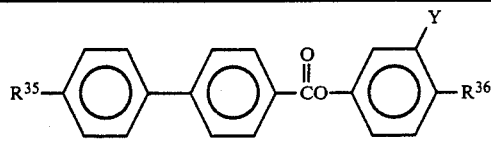

| In the above formula | | | Phase transition point (°C.) | | | | | |
|---|---|---|---|---|---|---|---|---|
| $R^{35}$ | $R^{36}$ | Y | C | SH | SC* | SA | N* | I |
| $C_9H_{19}O-$ | 1-methylheptyloxy* | H | • 71.1 | • 72.2 | • 121.5 | • 144.3 | — | • |
| 1-methylheptyloxy* | $C_8H_{17}O-$ | F | • 75.5 | — | • 95.4 | • 104.2 | • 104.9 | • |

(Note)
SH and * represent smetic H phase and an optically active group, respectively.

Main compounds of the formula (C-2) are exemplified in the following Table 13.

TABLE 13

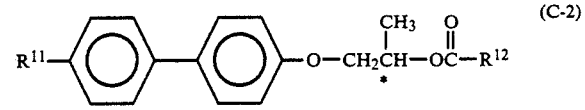

| In the above formula | | |
|---|---|---|
| $R^{11}$ | $R^{12}$ | M.P. (°C.) |
| $C_8H_{17}-$ | $C_2H_5-$ | 44.4 |
| $C_8H_{17}-$ | $C_3H_7-$ | 47.6 |
| $C_7H_{15}-$ | $C_5H_{11}-$ | 66.6 |
| $C_8H_{17}-$ | $C_5H_{11}-$ | 58.5 |
| $C_5H_{11}-$ | $C_6H_{13}-$ | 51.0 |
| $C_8H_{17}-$ | $C_6H_{13}-$ | 50.7 |
| $C_7H_{15}-$ | $C_7H_{15}-$ | 55.5 |
| $C_8H_{17}O-$ | $CH_3-$ | 81.0 |
| $C_8H_{17}O-$ | $C_2H_5-$ | 66.5 |
| $C_{11}H_{23}O-$ | $C_2H_5-$ | 84.5 |
| $C_6H_{13}O-$ | $C_3H_7-$ | 75.0 |
| $C_8H_{17}O-$ | $C_3H_7-$ | 70.9 |
| $C_8H_{17}O-$ | $C_4H_9-$ | 75.5 |
| $C_{11}H_{23}O-$ | $C_4H_9-$ | 81.6 |
| $C_6H_{13}O-$ | $C_8H_{17}-$ | 77.6 |
| $C_8H_{17}O-$ | 2-methylpropyl | 75.0 |
| $C_{11}H_{23}O-$ | 4-methylhexyl* | 68.2 |
| $C_8H_{17}O-$ | $CH_3$<br>$-CH-O-C_3H_7$<br>* | 52.3 |
| $C_8H_{17}O-$ | $CH_3$<br>$-CH-O-C_4H_9$<br>* | 45.0 |
| $C_8H_{17}O-$ | 1-methylpropyl* | 49.0 |
| $C_6H_{13}O-$ | $C_5H_{11}-$ | 75.0 |
| $C_8H_{17}O-$ | $C_5H_{11}-$ | 74.5 |
| $C_6H_{13}O-$ | $C_6H_{13}-$ | 76.0 |
| $C_8H_{17}O-$ | $C_6H_{13}-$ | 76.4 |
| $C_{11}H_{23}O-$ | $C_6H_{13}-$ | 80.9 |
| $C_8H_{17}O-$ | $C_7H_{15}-$ | 77.0 |
| $C_{11}H_{23}O-$ | $C_7H_{15}-$ | 80.5 |

Main compounds of the formula (C-3) are exemplified in the following Table 14.

TABLE 14

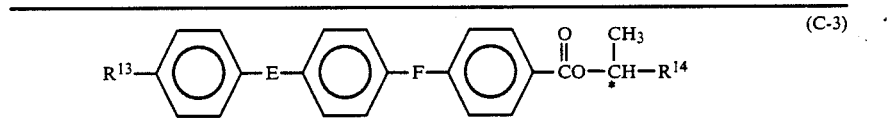

| In the above formula | | | | Phase transition point (°C.) | | | | |
|---|---|---|---|---|---|---|---|---|
| $R^{13}$ | $R^{14}$ | E | F | C | $S_4^*$ | $S_3^*$ | SC* | SA | I |
| $C_6H_{13}-$ | $C_6H_{13}-$ | $-CH_2O-$ | single bond | — | — | • 78.3 | • 80.5 | • 83.9 | • |
| $C_7H_{15}O-$ | $C_6H_{13}-$ | " | " | • 110.0 | — | — | (• 104.9 | • 109.8) | • |
| $C_8H_{17}-$ | $C_6H_{13}-$ | single bond | $-CH_2O-$ | • 52.0 | — | • 54.0 | • 66.0 | • 74.0 | • |
| $C_8H_{17}O-$ | $C_6H_{13}-$ | " | " | • 77.0 | — | — | • 99.0 | • 107.1 | • |
| $C_{10}H_{21}O-$ | $C_6H_{13}-$ | " | " | • 82.0 | — | • 86.0 | • 101.6 | • 104.3 | • |
| $C_7H_{15}-$ | $C_6H_{13}-$ | " | $-OCH_2-$ | • 56.5 | • 72.0 | • 109.4 | — | — | • |
| $C_8H_{17}-$ | $C_6H_{13}-$ | " | " | • 70.0 | (• 57.8) | • 92.2 | • 102.0 | — | • |
| $C_6H_{13}O-$ | $C_6H_{13}-$ | " | " | • 77.5 | • 131.0 | • 134.0 | • 138.0 | • 145.0 | • |
| $C_8H_{17}O-$ | $C_6H_{13}-$ | " | " | • 55.5 | • 119.0 | • 133.5 | • 135.0 | — | • |
| $C_9H_{19}O-$ | $C_6H_{13}-$ | " | " | • 74.0 | • 95.0 | • 113.5 | • 130.0 | — | • |
| $C_{10}H_{21}O-$ | $C_6H_{13}-$ | " | " | • 68.5 | • 88.0 | • 109.0 | • 127.5 | — | • |
| $C_{12}H_{25}O-$ | $C_6H_{13}-$ | " | " | • 82.5 | • 91.0 | • 102.5 | • 123.5 | — | • |
| $C_7H_{15}-$ | $C_3H_7-$ | " | " | • 86.5 | — | — | • 122.5 | • 124.2 | • |
| $C_7H_{17}-$ | $C_3H_7-$ | " | " | • 62.0 | — | — | • 117.3 | — | • |
| $C_5H_{11}O-$ | $C_3H_7-$ | " | " | • 119.5 | — | • 152.9 | • 155.0 | • 165.4 | • |
| $C_8H_{17}O-$ | $C_3H_7-$ | " | " | • 71.5 | • 121.1 | • 130.0 | • 149.1 | — | • |
| $C_9H_{19}O-$ | $C_3H_7-$ | " | " | • 59.5 | • 111.4 | • 124.0 | • 145.1 | — | • |
| $C_{10}H_{21}O-$ | $C_3H_7-$ | " | " | • 75.5 | • 121.8 | • 141.8 | • 143.1 | — | • |

(Note)
$S_3^*$ and $S_4^*$ both represent an unidentified smetic phase.

As described above, the present invention consists in that a compound of the formula (A) having a negative dielectric anisotropy is contained in a ferroelectric liquid crystal compound or a ferroelectric liquid crystal composition, and when a compound of the formula (A)

as the component A, a compound of the formula (B) as the component B and a compound of the formula (C-1), (C-2) or (C-3) as the component C are combined together, a ferroelectric liquid crystal composition having a negative dielectric anisotropy and high-speed response properties are obtained.

As described above, the compound as the component A has a negative dielectric anisotropy value as large as about −8 to −2, causes a negative dielectric anisotropy value to appear in the resulting ferroelectric liquid crystal composition which is the object of the present invention, causes the AC-stabilizing effect to occur even at low voltages, and as a result, plays an important role of generating good memory properties. The component A has a high melting point so that when it is used in too high a concentration, the melting point of the resulting ferroelectric liquid crystal composition becomes high; hence the temperature range of smectic C* phase becomes narrow. Thus, in order to present smectic C* phase in a broad temperature range including room temperature, the concentration of the component A used in the present invention is preferred to be 50% by weight or less based on the weight of the composition. The pyrimidine ring-containing compound of the formula (B) as the component B is a compound having a very low viscosity so that it plays an important role for improving the response properties, but most of the compounds of the formula (B) have a dielectric anisotropy value of about 0 to 5 and hence when they are used in a high concentration, the dielectric anisotropy value is liable to become positive, that is, this is undesirable. Thus, taking into account the reason for using component B, the concentration of the component B used in the present invention is preferred to be 50% by weight or less based on the weight of the composition.

The compound of the formula (C-1) as the component C is disclosed in Japanese patent application laid-open Nos. Sho 61-43/1986, Sho 61-210056/1986 and Sho 63-48254/ 1988, Japanese patent application Nos. Sho 62-053778/1987 and Sho 62-067097/1987, etc. each filed by the present assignee; further the compound of the formula (C-2) is disclosed in Japanese patent application Nos. Sho 61-133269/1986 and Sho 62-49796/1987, each filed by the present assignee; and further the compound of the formula (C-3) is disclosed in Japanese patent application No. Sho 60-149548/1985 filed by the present applicant. These compounds are ferroelectric liquid crystal compounds having superior high-speed response properties.

The respective proportions of the components A, B and C for obtaining liquid crystal compositions having the objective superior specific features, making use of the specific features of these components, have been researched. As a result, it has been found as described above that the proportions of the component A, the component B and the component C are preferred to be 5 to 50% by weight, 5 to 50% by weight and 5 to 50% by weight, each based on the weight of the composition, respectively.

The present invention will be described in more detail by way of Experimental examples and Examples, but it should not be construed to be limited thereto. In these examples, the spontaneous polarization value (Ps) was determined according to Sawyer-Tower method, the helical pitch (P) was determined by using a cell about 200 μm thick subjected to homogeneous alignment and directly measuring the dechiralization line corresponding to the helical pitch under a polarizing microscope. The tilt angle (θ) was determined by impressing an electric field sufficiently higher than the critical one to the cell subjected to homogeneous alignment to make the helical structure extinct, further inverting the polarity and measuring the moved angle (corresponding to 2θ) at the extinction site under crossed nicols.

The response time was determined by filling the respective compositions in a cell subjected to aligning treatment and having a distance between the electrodes of 2 μm, imparting a square wave of ±5V/μm, 100 Hz and measuring change in the intensity of transmitted light at that time.

The dielectric anisotropy value was determined by using a cell subjected to parallel aligning treatment and vertical aligning treatment, measuring the dielectric constant from the volume of the empty cell and the volume of the cell having a liquid crystal filled therein at 1 KHz, and calculating the dielectric anisotropy value.

EXAMPLE 1

A ferroelectric liquid crystal composition (Mix. 1) consisting of the above-mentioned three components A, B and C and shown below was prepared:

Component A:

- $C_7H_{15}O$—⟨phenyl⟩—⟨pyrimidine (N—N)⟩—$OC_6H_{13}$ — 10 wt. %
- $C_7H_{15}O$—⟨phenyl⟩—⟨pyrimidine (N—N)⟩—$OC_8H_{17}$ — 10 wt. %
- $C_8H_7O$—⟨phenyl⟩—⟨pyrimidine (N—N)⟩—$OCH_2\overset{*}{C}H(CH_3)C_2H_5$ — 10 wt. %
- $C_{12}H_{25}O$—⟨phenyl⟩—⟨pyrimidine (N—N)⟩—$OCH_2\overset{*}{C}H(CH_3)C_2H_5$ — 10 wt. %

-continued

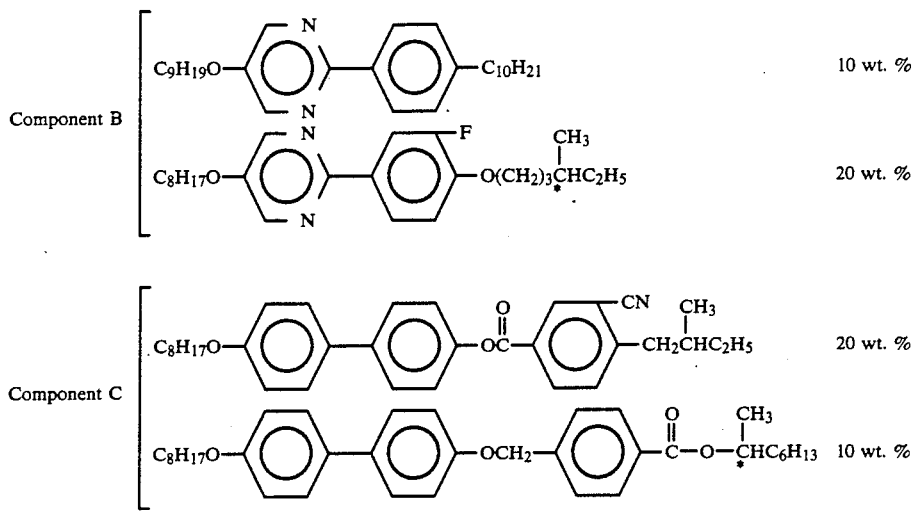

| | | | 10 wt. % |
| Component B | $C_9H_{19}O$—(pyrazine)—$C_{10}H_{21}$ | | |
| | $C_8H_{17}O$—(pyrazine)—(F-phenyl)—$O(CH_2)_3\overset{*}{C}H(CH_3)C_2H_5$ | | 20 wt. % |
| Component C | $C_8H_{17}O$—(phenyl)—(phenyl)—$OC(O)$—(CN-phenyl)—$CH_2\overset{*}{C}H(CH_3)C_2H_5$ | | 20 wt. % |
| | $C_8H_{17}O$—(phenyl)—(phenyl)—$OCH_2$—(phenyl)—$C(O)O$—$\overset{*}{C}H(CH_3)C_6H_{13}$ | | 10 wt. % |

This ferroelectric liquid crystal composition (Mix. 1) exhibited SC* phase within a range of room temperature to 59.0° C., a response time at 25° C. of 250 μsec, a tilt angle of 22.2°, a Ps of 14.2 nC cm$^{-2}$ and a dielectric anisotropy value of $-2.7$.

Figure 2:
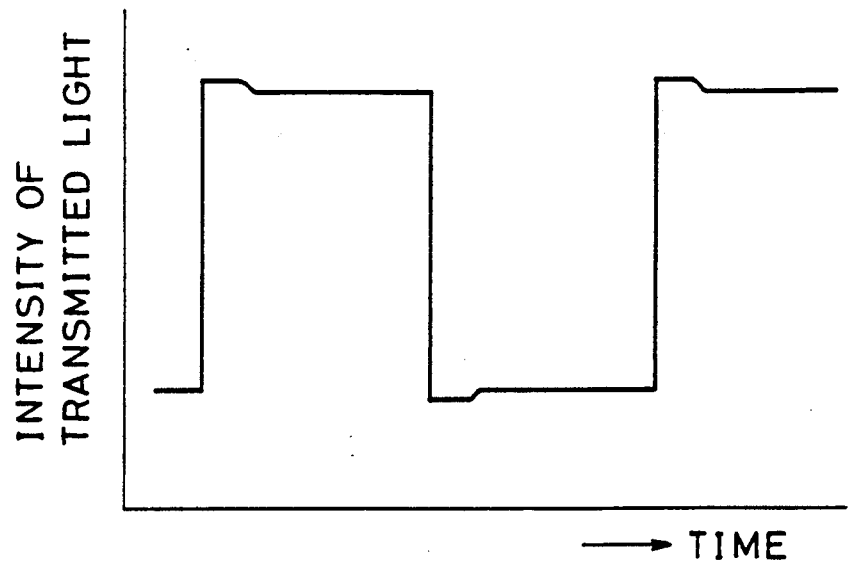
FIG. 2 shows a chart illustrating an optical response in the case where the voltage wave shown in FIG. 1 is overlapped with an AC wave of 25 KHz.

This composition (Mix. 1) was filled between two substrates each having a transparent electrode subjected to rubbing treatment on its surface, placing an electro-optical element composed so as to give a cell thickness of 5 μm, between two polarizers crossed to each other, impressing a pulse wave (pulse width: 1 msec, ±25V) as shown in FIG. 1, overlapping an AC wave of 20 KHz, ±25V with the pulse wave and observing change in the level of transmitted light. As a result, good memory properties as shown in FIG. 2 were obtained.

As described above, when a compound having a negative dielectric anisotropy as the component of the present invention is added, the resulting ferroelectric liquid crystal composition has a large negative dielectric anisotropy value so that AC-stabilizing effect is notably exhibited, good memory properties are obtained and also the response time is very quick (about ¼) as compared with that disclosed in Jeary's report and further, a low AC voltage (about ½); hence it has been found that the ferroelectric liquid crystal composition of the present invention is very suitable to practical use.

EXAMPLES 2-7

Table 15 shows the proportions of ferroelectric liquid crystal compositions (Mix. 2 to Mix. 7) and Table 16 shows the specific features thereof.

TABLE 15

(Proportions in Tables refer to % by weight.)

| | | | Name of composition (Mix. 2~7) | | | | | |
|---|---|---|---|---|---|---|---|---|
| Component | Formula | Compound | 2 | 3 | 4 | 5 | 6 | 7 |
| A | (A) | $C_7H_{15}O$—(phenyl)—(pyridazine N—N)—$C_6H_{13}$ | 8 | 10 | 10 | | 6 | 5 |
| A | (A) | $C_7H_{15}O$—(phenyl)—(pyridazine N—N)—$OC_8H_{17}$ | 8 | 10 | 10 | 10 | 6 | 5 |
| A | (A) | $C_9H_{19}O$—(phenyl)—(pyridazine N—N)—$OCH_2\overset{*}{C}H(CH_3)C_2H_5$ | | | | 10 | 6 | 10 |
| A | (A) | $C_{12}H_{25}$—(phenyl)—(pyridazine N—N)—$OCH_2\overset{*}{C}H(CH_3)C_2H_5$ | 8 | 10 | | | | |

TABLE 15-continued (Proportions in Tables refer to % by weight.)

| | Formula | Compound | Name of composition (Mix. 2~7) | | | | | |
|---|---|---|---|---|---|---|---|---|
| | | | 2 | 3 | 4 | 5 | 6 | 7 |
| A | (A) | $C_8H_{17}O$—⟨Ph⟩—⟨Pyridazine⟩—$OCH_2\overset{*}{C}H(CH_3)C_2H_5$ | 8 | 10 | 10 | 10 | 6 | 10 |
| A | (A) | $C_{12}H_{25}$—⟨Ph⟩—⟨Pyridazine⟩—$O\overset{*}{C}H(CH_3)C_6H_{13}$ | 8 | | | | | |
| A | (A) | $C_8H_{17}O$—⟨Pyridazine⟩—⟨Ph(F)⟩—$OC_8H_{17}$ | | | | 3 | | |
| A | (A) | $C_9H_{19}$—⟨Ph⟩—⟨Pyridazine⟩—⟨Ph(F)⟩—$O\overset{*}{C}H(CH_3)C_6H_{13}$ | | | | 3 | | |

Compound

| | Formula | Compound | | | | | | |
|---|---|---|---|---|---|---|---|---|
| B | (B) | $C_7H_{15}$—⟨Pyrimidine⟩—⟨Ph⟩—$OC_6H_{13}$ | | | | | 10 | |
| B | (B) | $C_7H_{15}$—⟨Pyrimidine⟩—⟨Ph⟩—$OC_9H_{19}$ | | | | | 5 | |
| B | (B) | $C_8H_{17}O$—⟨Pyrimidine⟩—⟨Ph⟩—$C_6H_{13}$ | | | | | 5 | 5 |
| B | (B) | $C_9H_{19}O$—⟨Pyrimidine⟩—⟨Ph⟩—$C_6H_{13}$ | | | | | 3 | 3 |
| B | (B) | $C_9H_{19}O$—⟨Pyrimidine⟩—⟨Ph⟩—$C_7H_{15}$ | | | | | 5 | 5 |
| B | (B) | $C_9H_{19}O$—⟨Pyrimidine⟩—⟨Ph⟩—$C_8H_{17}$ | | | | 10 | 2 | 2 |
| B | (B) | $C_9H_{19}O$—⟨Pyrimidine⟩—⟨Ph⟩—$C_9H_{19}$ | | | | | 5 | 5 |

TABLE 15-continued (Proportions in Tables refer to % by weight.)

| Formula | | Compound | \multicolumn{6}{c}{Name of composition (Mix. 2~7)} | | | | | |
|---|---|---|---|---|---|---|---|---|
| | | | 2 | 3 | 4 | 5 | 6 | 7 |
| B | (B) | $C_9H_{19}O$–[pyrazine]–[phenyl]–$C_{10}H_{21}$ | 15 | 18 | 10 | | | |
| B | (B) | $C_8H_{17}$–[pyrazine]–[phenyl(F)]–$O(CH_2)_3\overset{*}{C}H(CH_3)C_2H_5$ | 15 | 10 | 10 | | 5 | 10 |
| B | (B) | $C_8H_{17}$–[pyrazine]–[phenyl(F)]–$O(CH_2)_5\overset{*}{C}H(CH_3)C_2H_5$ | | | | | 10 | |
| Compound C | (C-1) | $C_6H_{13}$–[phenyl]–OCO–[phenyl]–[phenyl(F)]–$O\overset{*}{C}H(CH_3)C_6H_{13}$ | | | | 7 | | |
| C | (C-1) | $C_7H_{15}$–[phenyl]–OCO–[phenyl]–[phenyl]–$O\overset{*}{C}H(CH_3)C_6H_{13}$ | | | | 10 | 5 | |
| C | (C-1) | $C_8H_{17}O$–[phenyl]–[phenyl]–OCO–[phenyl(CN)]–$CH_2\overset{*}{C}H(CH_3)C_2H_5$ | 20 | 10 | 10 | 12 | 10 | 10 |
| C | (C-1) | $C_{10}H_{21}O$–[phenyl]–[phenyl]–OCO–[phenyl(CN)]–$CH_2\overset{*}{C}H(CH_3)C_2H_5$ | | 12 | 10 | | 5 | 10 |
| C | (C-1) | $C_8H_{17}$–[phenyl]–OCO–[phenyl]–[phenyl(CN)]–$O(CH_2)_5\overset{*}{C}H(CH_3)C_2H_5$ | | | | | | 5 |
| C | (C-1) | $C_5H_{11}O$–[phenyl]–OCO–[phenyl]–[phenyl(CN)]–$O(CH_2)_7\overset{*}{C}H(CH_3)C_2H_5$ | | | | | | 5 |
| C | (C-2) | $C_8H_{17}O$–[phenyl]–[phenyl]–$O-CH_2\overset{*}{C}H(CH_3)-OCO-C_3H_7$ | | | | | | |
| C | (C-2) | $C_8H_{17}O$–[phenyl]–[phenyl]–$O-CH_2\overset{*}{C}H(CH_3)-OCO-C_4H_9$ | | | | | 3 | |

TABLE 15-continued (Proportions in Tables refer to % by weight.)

| Formula | | Compound | Name of composition (Mix. 2~7) | | | | | |
|---|---|---|---|---|---|---|---|---|
| | | | 2 | 3 | 4 | 5 | 6 | 7 |
| C | (C-2) | 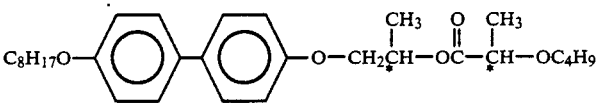 | 5 | 5 | | | 5 | 5 |
| C | (C-2) | 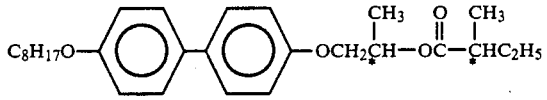 | | | | 3 | | |
| C | (C-3) | 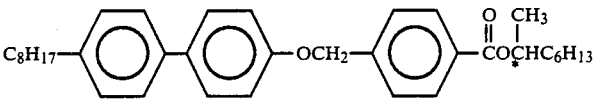 | 5 | 5 | 5 | | | |
| C | (C-3) | 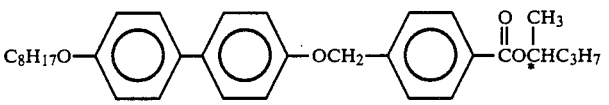 | | | | | 5 | |
| C | (C-3) | 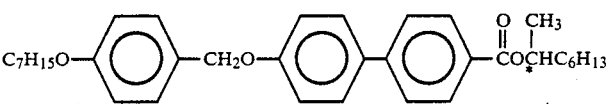 | 5 | | | | | |

Component

| Component other than (A), (B) and (C) | 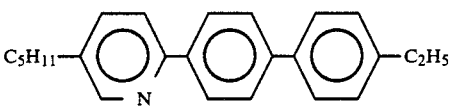 | | | | 10 | | |
|---|---|---|---|---|---|---|---|
| | 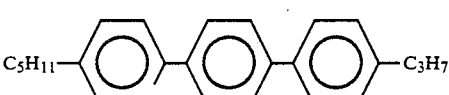 | | | | | 10 | 10 |
| | 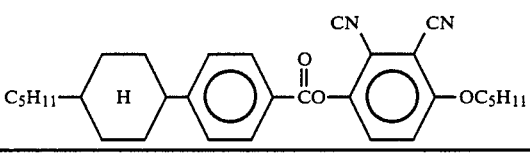 | | | | | | 5 |

TABLE 16

| Specific features | Name of composition (Mix. 2~7) | | | | | |
|---|---|---|---|---|---|---|
| | 2 | 3 | 4 | 5 | 6 | 7 |
| Temperature range of SC* phase (°C.) | room temp.~52 | room temp.~59 | room temp.~59 | −10~68 | 3~67 | 21~50 |
| Spontaneous polarization (nC/cm²) value [25° C.] | 27.0 | 24.0 | 22.0 | 14.5 | 21.5 | 19.3 |
| Tilt angle (°) [25° C.] | 21.5 | 23.0 | 22.3 | 25.0 | 22.7 | 20.2 |
| Response time (μsec) [25° C.] | 200 | 190 | 200 | 250 | 270 | 290 |
| Dielectric anisotropy value [25° C.] | −2.4 | −2.5 | −2.4 | −1.5 | −2.2 | −3.5 |

In Table 15, the phase transition order of the composition (Mix. 5) is as follows:

C→SC*→SA→N*→I, while the phase transition orders of other compositions are as follows:

C→SC*→SA→I

In addition, in Mixs. 5, 6 and 7 of Tables 15, besides components A, B and C, the compositions contain another achiral compound or chiral liquid crystal compound for broadening the temperature region of SC* phase, elongating the helical pitch of SC* phase and for similar objects, but it does not damage the specific features of the ferroelectric liquid crystal composition of the present invention to contain these compounds; hence this does not raise any problem.

The ferroelectric liquid crystal composition of Mix. 6 was filled in a cell of a cell gap of 5 μm provided with transparent electrodes each obtained by coating PVA as an aligning treatment agent, rubbing the resulting surface and subjecting it to a parallel aligning treatment, followed by placing the resulting liquid crystal cell between two polarizers arranged in a crossed nicols state, and overlapping a pulse wave of a pulse width of 1 msec, ±25V with an AC wave of 25 KHz, ±20 V. As a result, as shown in FIGS. 1 and 2, a good AC-stabilizing effect was observed, memory properties were also good and contrast ratio was as good as 1:20; thus a liquid crystal display element suitable to practical uses was obtained.

According to the present invention, a ferroelectric liquid crystal composition having a negative dielectric anisotropy, a good AC-stabilizing effect and still high-speed response properties, and a light switching element using the above composition are obtained. As the use applications of the ferroelectric liquid crystal composition of the present invention, high-speed liquid crystal shutter, high-multiplexing display, etc. are exemplified.

What we claim is:

1. A ferroelectric liquid crystal composition comprising at least the following three components A, B and C in proportions of 5 to 50% by weight of said component A, 5 to 50% by weight of said component B and 5 to 50% by weight of said component C, wherein the total amount of said components A, B and C is at least 80% by weight of said composition, and said composition having a negative anisotropy value:

said component A being at least one compound selected from the group consisting of compounds of the formula

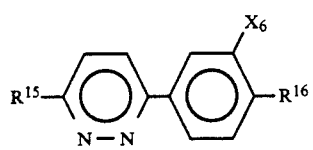
(A2-1)

wherein $R^{15}$ represents a linear alkoxy group of 4 to 10 carbon atoms,

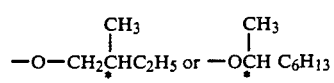

wherein * indicates an asymmetric carbon atom, $R^{16}$ represents a linear alkyl group or alkoxy group each of 5 to 12 carbon atoms and $X^6$ represents H or F, and compounds of formula

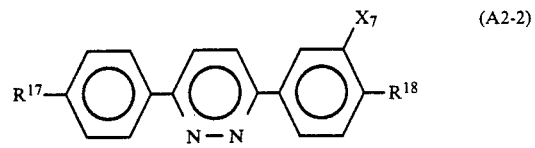
(A2-2)

wherein $R^{17}$ represents a linear alkyl group of 3 to 9 carbon atoms, $R^{18}$ represents

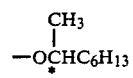

wherein * indicates an asymmetric carbon atom and $X^7$ represents H or F, said component B being at least one compound selected from the group consisting of compounds of the formula

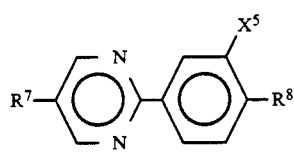
(B)

wherein $R^7$ represents a linear alkyl group or alkoxy group each of 7 to 15 carbon atoms, $R^8$ represents a linear alkyl group or alkoxy group each of 6 to 12 carbon atoms or

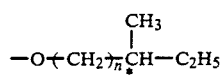

wherein n represents an integer of 2 to 7 and * indicates an asymmetric carbon atom, and $X^5$ represents H or F, and said component C being at least one compound selected from the group consisting of compounds of the formula

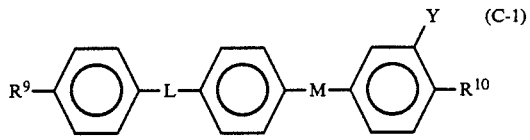
(C-1)

wherein $R^9$ represents a linear alkyl group or alkoxy group each of 5 to 12 carbon atoms, $R^{10}$ represents

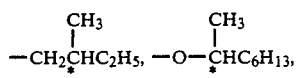

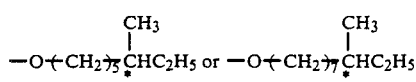

wherein * indicates an asymmetric carbon atom, one of L and M represents

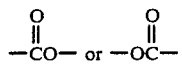

and the other represents a single bond, and Y represents F or CN, and
compounds of the formula

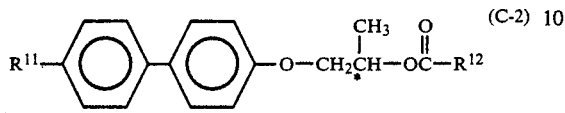

wherein $R^{11}$ represents a linear alkyl group or alkoxy group each of 5 to 11 carbon atoms, $R^{12}$ represents a linear alkyl group of 1 to 8 carbon atoms or

wherein R represents a linear alkoxy group of 2 to 5 carbon atoms or ethyl, and * represents an asymmetric carbon atom, and
compounds of the formula

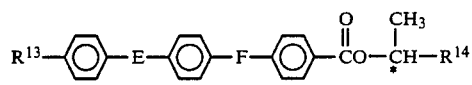

wherein $R^{13}$ represents a linear alkyl group or alkoxy group each of 5 to 12 carbon atoms, $R^{14}$ represents a linear alkyl group of 3 to 6 carbon atoms, one of E and F represents —CH$_2$O— or —OCH$_2$— and the other represents a single bond, and * indicates an asymmetric carbon atom.

2. A ferroelectric liquid crystal composition according to claim 1, wherein said component A is at least one compound selected from the group consisting of

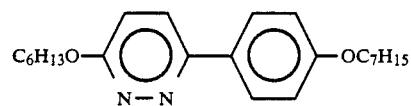

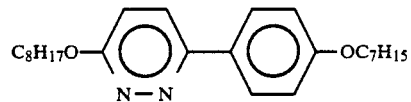

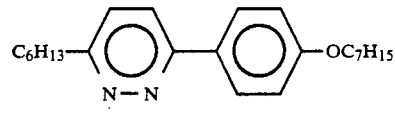

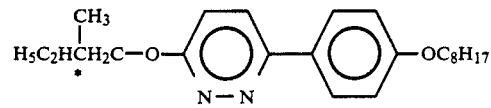

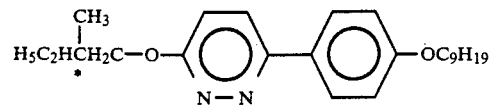

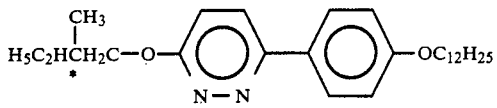

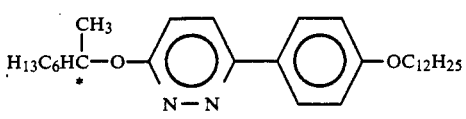

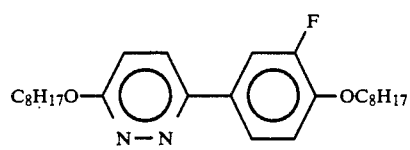

and

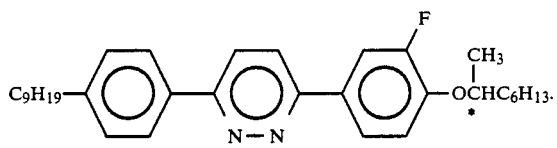

3. A ferroelectric liquid crystal composition according to claim 1, wherein said component B is at least one compound selected from the group consisting of

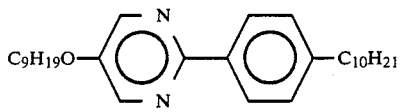

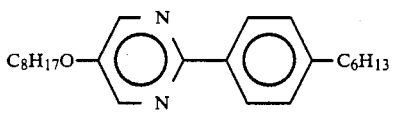

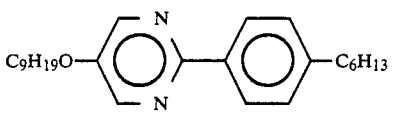

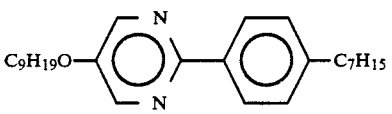

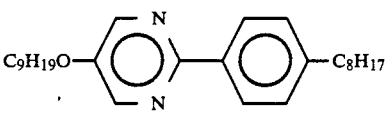

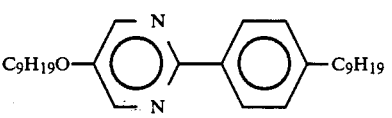

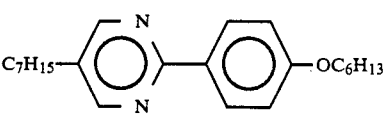

-continued

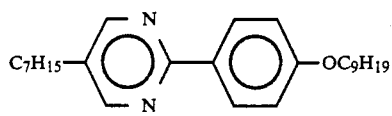

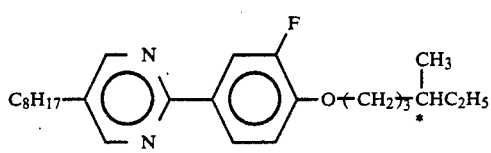

and

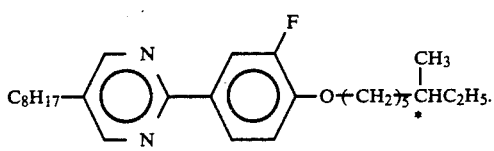

4. A ferroelectric liquid crystal composition according to claim 1, wherein said component C is at least one compound selected from the group consisting of

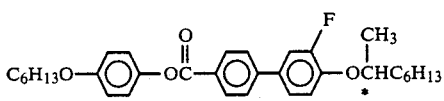

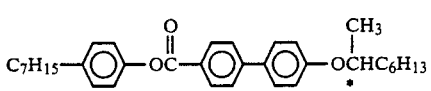

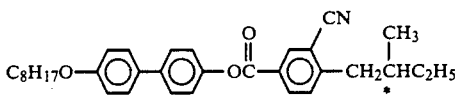

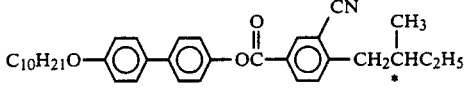

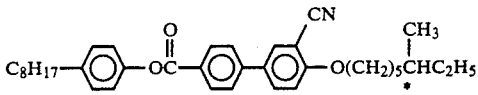

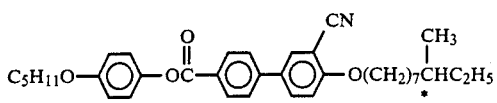

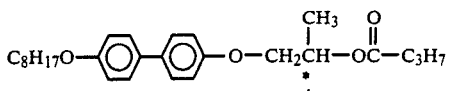

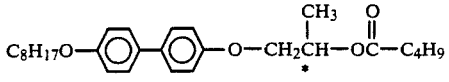

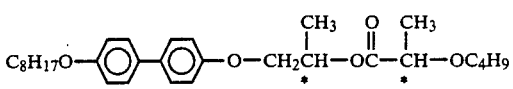

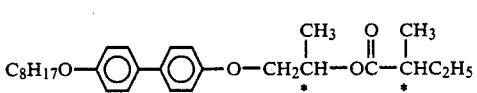

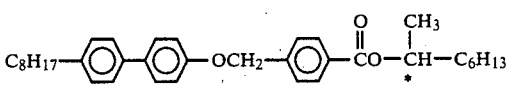

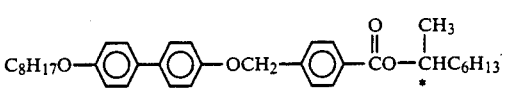

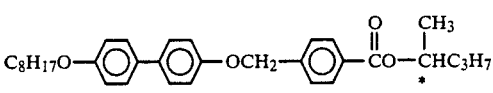

and

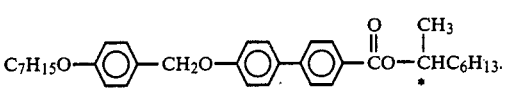

5. A light switching element comprising a liquid crystal composition as set forth in claim 1.

6. A light switching element comprising a liquid crystal composition as set forth in claim 2.

7. A light switching element comprising a liquid crystal composition as set forth in claim 3.

8. A light switching element comprising a liquid crystal composition as set forth in claim 4.

* * * * *